United States Patent
Guidotti et al.

(10) Patent No.: US 9,586,411 B2
(45) Date of Patent: Mar. 7, 2017

(54) OBTURATOR AND METHOD OF FABRICATION THEREOF

(71) Applicant: INGEGNERIA CERAMICA SRL, Sassuolo (IT)

(72) Inventors: Gianmario Guidotti, Modena (IT); Giovanni Barbanti, Casalecchio di Reno (IT); Marco Faretra, Longiano (IT)

(73) Assignee: I.C. S.R.L. CON SOCIO UNICO, Sassuolo (IT)

( * ) Notice: Subject to any disclaimer, the term of this patent is extended or adjusted under 35 U.S.C. 154(b) by 0 days.

(21) Appl. No.: 14/909,404

(22) PCT Filed: Jul. 31, 2014

(86) PCT No.: PCT/IB2014/063585
§ 371 (c)(1),
(2) Date: Feb. 1, 2016

(87) PCT Pub. No.: WO2015/015453
PCT Pub. Date: Feb. 5, 2015

(65) Prior Publication Data
US 2016/0176196 A1  Jun. 23, 2016

(30) Foreign Application Priority Data
Jul. 31, 2013  (GB) .................................. 1313738.5

(51) Int. Cl.
*B41J 2/175* (2006.01)
*F16K 99/00* (2006.01)
*B41J 2/14* (2006.01)

(52) U.S. Cl.
CPC ....... *B41J 2/17596* (2013.01); *B41J 2/14201* (2013.01); *F16K 99/0048* (2013.01); *B41J 2202/05* (2013.01)

(58) Field of Classification Search
CPC ...... B41J 2/17596; F16K 3/0218; F16K 3/18; F16K 3/28; F16K 3/246; F16K 3/267;
(Continued)

(56) References Cited

U.S. PATENT DOCUMENTS

| 4,514,742 A * | 4/1985 | Suga ................... B41J 2/17596 137/513.7 |
| 6,471,181 B2 * | 10/2002 | Duelli ...................... F16K 3/18 251/193 |

(Continued)

FOREIGN PATENT DOCUMENTS

| EP | 1972450 A2 | 9/2008 |
| ES | 2386267 A1 | 8/2012 |

(Continued)

*Primary Examiner* — Anh T. N. Vo
(74) *Attorney, Agent, or Firm* — Pearne & Gordon LLP

(57) ABSTRACT

An obturator device (1) for a printhead comprising: an obturator assembly (3) having a valve surface (6) movable along at least one direction of displacement (X) between a first position in which the valve surface (6) is at a distance from a reference surface (A) and a second position in which the valve surface (6) is in contact with the reference surface (A); an actuator (2), secured to the obturator assembly (3) and operable to displace the obturator assembly (3) between the first position and second position; characterized in that the obturator assembly (3) comprises: an adjustable coupling (11) configured to allow the valve surface (6) to align its orientation relative to the reference surface (A) thereby ensuring improved engagement between the surfaces.

13 Claims, 4 Drawing Sheets

(58) Field of Classification Search
CPC ...... F16K 1/205; F16K 1/2057; F16K 1/2071; F16K 99/0048; F16K 2099/0092
See application file for complete search history.

(56) References Cited

U.S. PATENT DOCUMENTS

| | | | | |
|---|---|---|---|---|
| 7,156,507 | B2 * | 1/2007 | Aruga | B41J 2/17509 |
| | | | | 347/85 |
| 8,177,190 | B2 * | 5/2012 | Maerk | F16K 3/0218 |
| | | | | 251/158 |
| 8,622,368 | B2 * | 1/2014 | Geiser | F16K 51/02 |
| | | | | 251/228 |
| 8,827,241 | B2 * | 9/2014 | Geiser | F16K 51/02 |
| | | | | 251/193 |
| 2011/0186762 | A1 | 8/2011 | Geiser | |
| 2015/0037501 | A1 | 2/2015 | Aparisi et al. | |

FOREIGN PATENT DOCUMENTS

| | | |
|---|---|---|
| GB | 1427866 A | 3/1976 |
| JP | H0429849 A | 1/1992 |

* cited by examiner

OBTURATOR AND METHOD OF FABRICATION THEREOF

The present invention relates to an obturator device comprising an obturator assembly and an actuator. The device according to the present invention may find a useful application, in particular, in a printhead for an ink-jet printer which can be used for in-line decoration of ceramic tiles.

Conventional printheads for ink-jet printing a fluid e.g. glaze, engobe, ink etc. comprise, among other things, an actuating element having an obturator assembly associated therewith and at least one nozzle for ejecting the fluid from a chamber onto a substrate e.g. ceramic tiles, whereby the obturator is operable to close/open the nozzle relative to the chamber to control droplet ejection therefrom.

For example, EP1972450B discloses an example of a conventional printhead 100 used to print glaze as shown in section in FIG. 1. The printhead 100 comprises a fluid chamber 102, having a fluid inlet (not shown) and fluid outlet (not shown), connected to a closed ink supply system whereby the glaze 104 flows through the chamber 102 from the input to the output under a pressure of e.g. 1 bar.

The printhead 100 comprises an actuator in the form of a piezoelectric element 106 having an obturator 107 coupled thereto and located inside the chamber 102, whilst the printhead 100 further comprises a nozzle portion 108 having a surface inside the chamber 102 and having at least one through-hole nozzle 109 therein providing a flow pathway from inside the chamber 102 to a substrate 110 located outside the chamber 102.

An obturator is any mechanical element which is operable to engage with the nozzle portion 108 to prevent/restrict the flow of fluid into the nozzle 109.

The chamber is provided with an elastomeric seal 112, to prevent the glaze exiting the chamber 102 at any point other than the nozzle 109, and through the fluid inlet and outlet, whereby the seal is also operable to support the actuator 106 in the chamber 102.

As the obturator 107 is coupled to the piezoelectric element 106, it moves in the same direction of deflection of the piezoelectric element 106, and is configured to engage with the nozzle portion 108 to close the nozzle 109 relative to the chamber when piezoelectric element 106 is in a non-deflected position, and to disengage from the nozzle portion 108 thereby uncovering the nozzle 109, when the actuator 106 is in a deflected position.

In order for the printhead 100 to function efficiently, the valve surface 105 of the obturator assembly 107 must be coplanar with the bearing surface of the nozzle portion 108, so as to provide sufficient closure of the nozzle 109 when the obturator assembly 107 is arranged with its valve surface in contact with the nozzle portion 108.

However, it will be appreciated that the conventional printhead 100 requires a plurality of components having μm dimensions, and/or precision assembly which are required to engage with each other in order to provide the desired functionality.

If the components are fabricated incorrectly, and/or assembled incorrectly, then the operating performance of the printhead will be affected. For example, if the obturator does not align correctly with the nozzle to sufficiently restrict the flow of fluid into the nozzle, then fluid will leak from the chamber, leading to nozzle wetting, poor or complete loss of droplet ejection control, or a non-jetting nozzle, each resulting in significantly compromised print quality.

Whilst it is possible to fabricate components with high precision using available micro-machining techniques, such techniques are complicated and expensive e.g. micro-electrical discharge machining, laser fabrication, etching etc. Furthermore, it is also possible to create highly accurate robotic assembling equipment to assemble the components in a precise and accurate manner, but such equipment is expensive.

One technique used to avoid poor coupling between the obturator 107 and the nozzle portion 108, is achieved by forcing the obturator into contact with the nozzle portion 108 with high pressure. However, such functionality results in increased rates of wear on the obturator and nozzle surfaces, which, in turn, results in a degradation of printhead performance, and such functionality also requires a higher drive voltage.

Therefore, it is an object of the present invention to provide an improved obturator device which addresses the above-identified problems of the prior art.

Accordingly in a first aspect, there is provided an obturator device for a printhead comprising: an obturator assembly having a valve surface movable along at least one direction of displacement between a first position, in which the valve surface is at a distance from a reference surface, and a second position, in which the valve surface is in contact with the reference surface; an actuator, secured to the obturator assembly and operable to displace the obturator assembly between the first position and second position; characterized in that the obturator assembly comprises: an adjustable coupling configured to allow the valve surface to engage with the reference surface and align its orientation relative thereto.

Preferably, the valve-surface self-aligns its orientation relative to the reference surface.

Preferably, fixing means are operable to retain the coupling in the position where the valve surface is substantially coplanar with the reference surface.

Preferably, the adjustable coupling has a structure designed to allow rotation of the valve surface about its centre.

Preferably, the adjustable coupling has a structure designed to allow displacement of the valve surface along a direction of displacement with respect to the obturator assembly.

Preferably, the obturator assembly further comprises a connecting element, and a valve element, with which the valve surface is associated and which is adapted to house at least part of the connecting element.

Preferably, the fixing means comprise an adhesive, wherein the adhesive material is arranged between the connecting element and valve element.

Preferably the obturator device further comprises biasing means arranged between the connecting element and the valve element configured to bias the valve surface away from the connecting element.

Preferably, the actuator comprises a piezoelectric element.

Preferably, the connecting element further comprises a shaped structure at a distal end thereof.

Preferably, the shaped structure is substantially spherical.

In a second aspect, there is provided a printhead comprising: a nozzle portion having a bearing which is coplanar with the reference surface; an obturator device comprising an obturator assembly having a valve surface movable along at least one direction of displacement between a first position, in which the valve surface is at a distance from a reference surface, and a second position, in which the valve surface is in contact with the reference surface; an actuator, secured to the obturator assembly and operable to displace the obturator assembly between the first position and second position; characterized in that the obturator assembly comprises an adjustable coupling configured to allow the valve surface to align its orientation relative to the reference surface.

In a third aspect there is provided a method for adjusting the orientation of a valve surface associated with an obturator assembly by means of an adjustable coupling adapted to allow the valve surface to rotate about an adjusting centre, comprising the following steps: displacing the obturator assembly along a direction of displacement so as to bring the valve surface into contact with a reference surface wherein the valve surface is operable to modify its orientation such that it is substantially parallel to the reference surface when in contact therewith; and fixing the valve surface in position.

An obturator device which has the abovementioned characteristics is able to ensure mating between the valve surface of the obturator assembly and surface of a nozzle portion with an extreme degree of precision and repeatability, compensating for the effect of the assembly and/or manufacturing tolerances of the various components.

Preferably, the obturator assembly further comprises spring means which are arranged between the obturator assembly and the valve surface.

Further characteristic features and advantages of the present invention will emerge more clearly from the following detailed description of an embodiment of the invention illustrated purely by way of a non-limiting example in the accompanying drawings in which.

Figure 1:
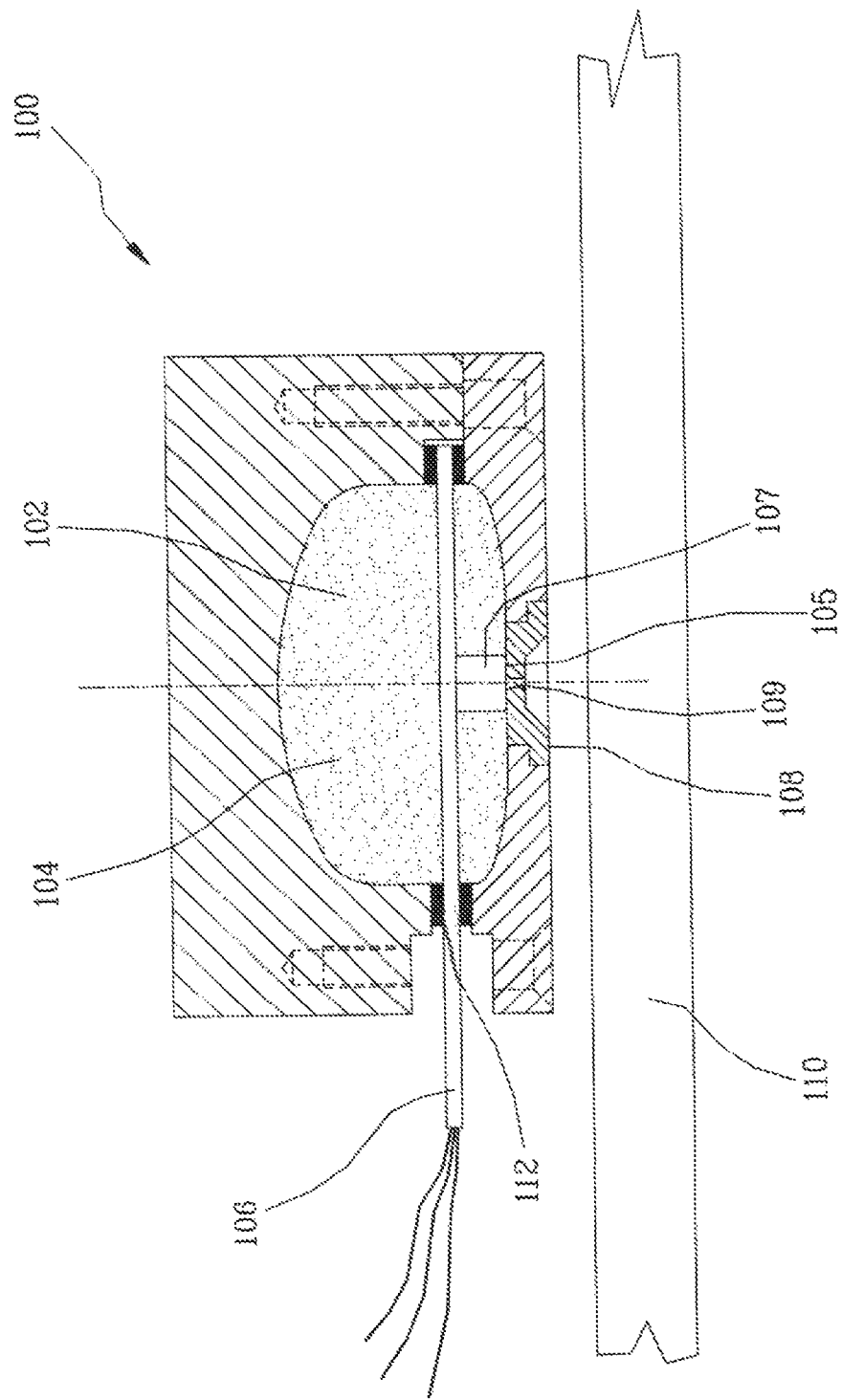
FIG. 1 shows in section an example of a conventional printhead of the prior art.
Figure 2:
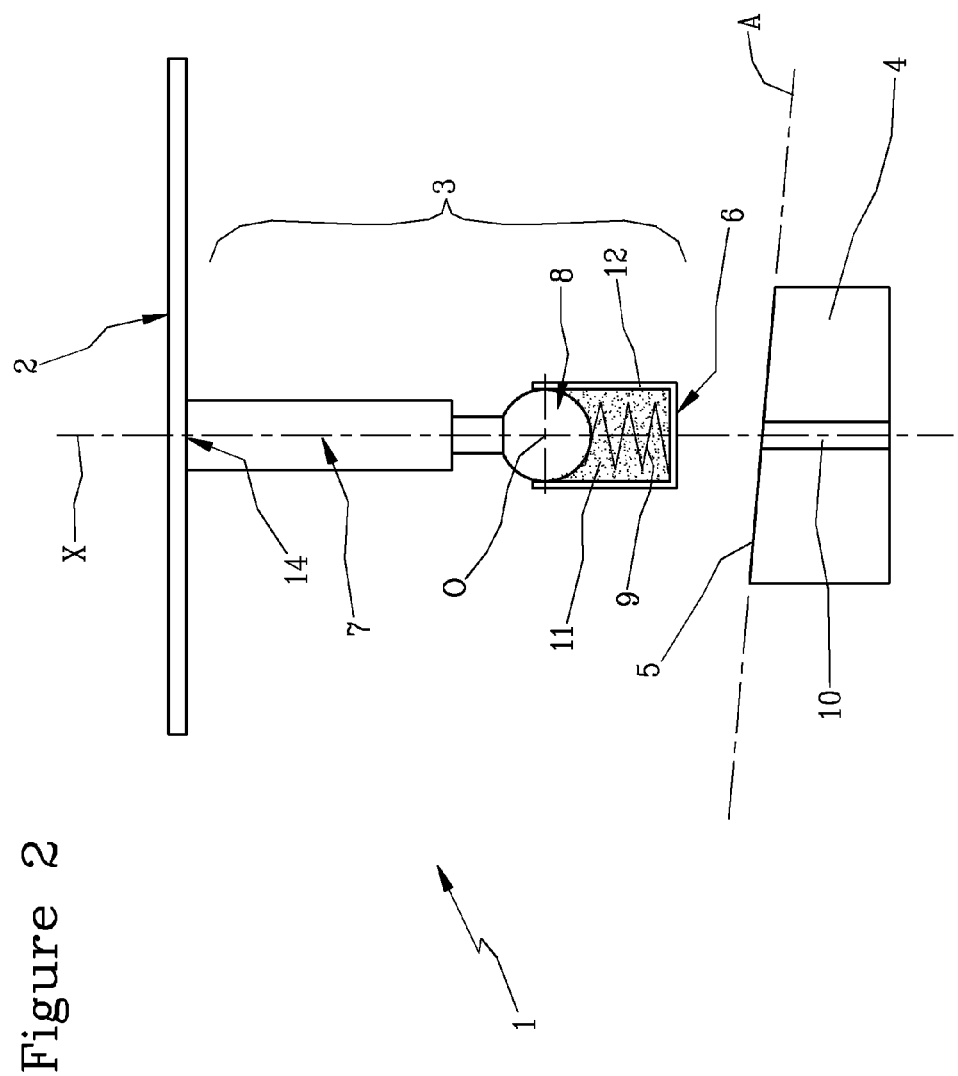
FIG. 2 shows a schematic view of the obturator device according to the present invention, in which a obturator assembly is situated in a first operating position.
Figure 3:
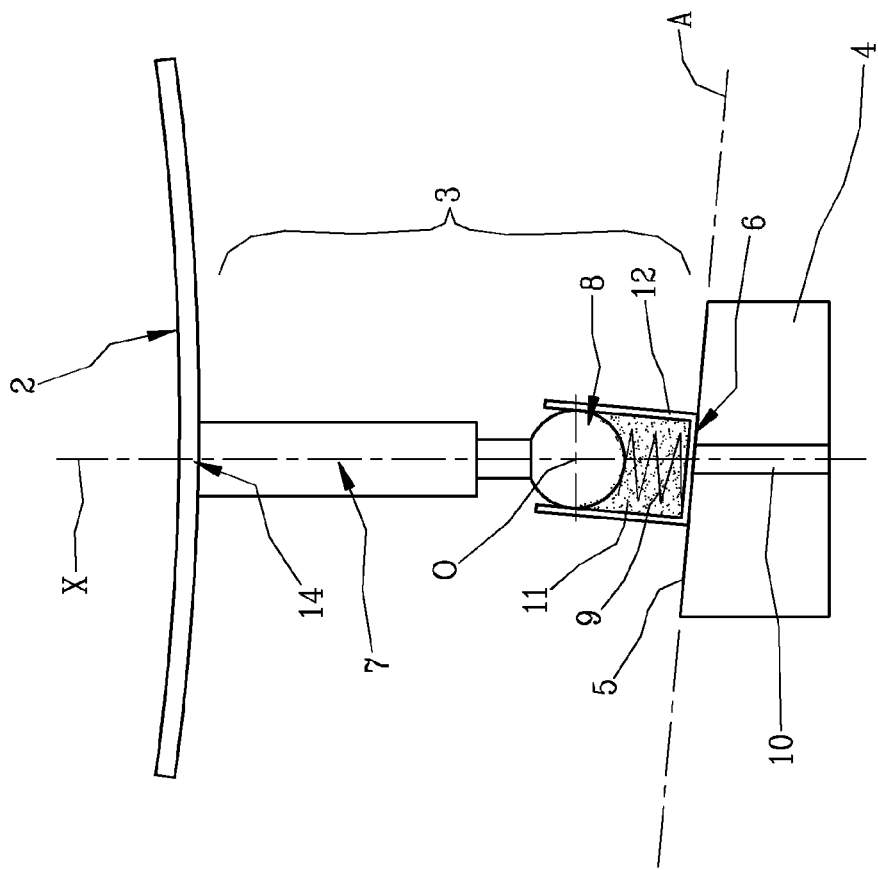
FIG. 3 shows a schematic view of the obturator device according to the present invention, in which the obturator assembly is situated in a second operating position.
Figure 4:
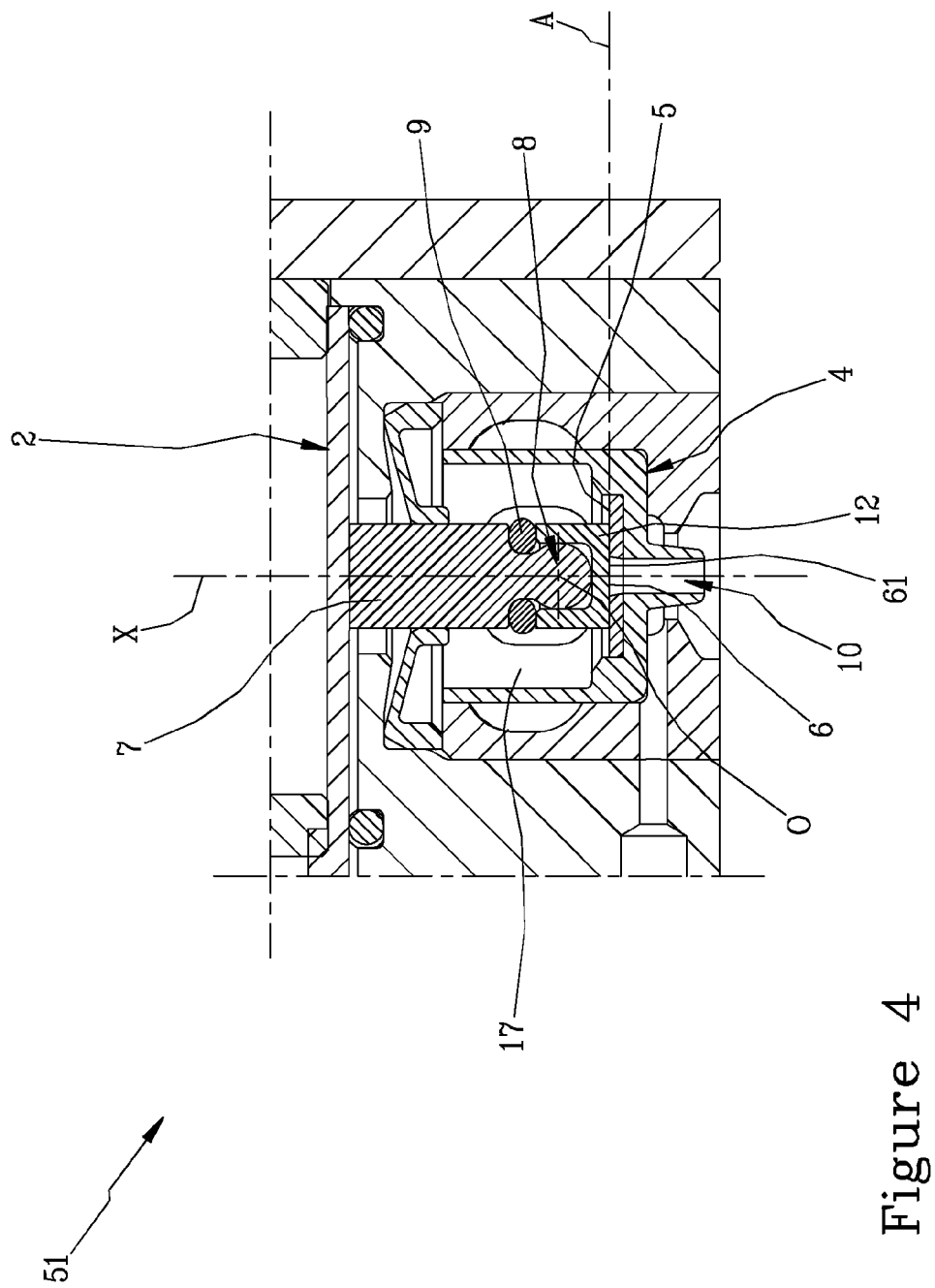
FIG. 4 shows a cross-sectional view of a printhead showing a preferred embodiment of the obturator device of FIG. 2.

In particular, but not exclusively, the obturator device according to the present invention, denoted overall by 1 in the abovementioned FIGS. 2-4, may be usefully applied to an ink-jet printhead for the in-line digital deposition of droplets e.g. printing/coating of substrates such as ceramic tiles using a glaze composition to achieve specific surface finish effects including protective coating, gloss to matt finish with local effects, or using an engobe composition to provide texture effects to imitate stone, wood, grain etc.

Whilst the operation of the printhead is described hereinafter using glaze, it will be appreciated that any suitable fluid could be used depending on the specific application e.g. methyl ethyl ketone or acetone based ink for printing on cardboard/paper/food packaging, a polymer/metallic based ink for 3D-printing, engobe for printing on ceramics, or a food based fluid such as chocolate.

The glaze itself may contain pigment to provide colour after firing, and have other additives such as clay to provide different finishes such as glossy, matt, opaque finishes that may be combined on the same surface, as well as special effects such as metallic tones and lustre.

Texture or relief structures can be provided by printing a solution containing predominantly engobe. An example digital glaze composition is disclosed in ES2386267. Particle sizes within the glaze are generally in the range of between 0.1 µm-50 µm, but preferably up to 10 µm, and more preferably the glaze has a particle size distribution whereby $D_{90}>6$ µm.

Alternatively engobe may be used in the printhead, whereby, as will be appreciated by a person skilled in the art, engobe is used to provide a consistent clean canvass or profile on the surface of the tile.

Engobe is a clay particle suspension, whilst glaze generally comprises an aqueous or solvent based glass frit suspension, or a suspension within a solution, made up of a liquid part having a quantity of mineral particulates/powders dispersed therein, whereby the specific glaze formulation is dependent on the requirements of the end user. A glaze may also contain engobe.

The printhead comprises a fluid chamber, designed to contain the glaze to be deposited on a substrate, whereby the glaze is supplied to the chamber from a controlled glaze supply system via an inlet and an outlet at a pressure of e.g. 0.1 Bar-10 Bar, and preferably, wherein the pressure is preferably between 0.5 and 1.5 Bar, and preferably substantially equal to 1 Bar.

With particular reference to the embodiment shown in FIGS. 2 and 3, the obturator device 1 comprises an obturator assembly 3 comprising a connecting element in the form of an elongated connecting rod 7, connected to an actuator e.g. a piezoelectric element 2 at a first end 14 using an adhesive e.g. Loctite 438, and further connected to a valve head 12 at a distal end, wherein the valve head 12 has a valve surface 6 associated therewith. In the present embodiment the obturator device 1 is located in a fluid chamber of a printhead (not shown).

It is advantageous for the valve head 12 and connecting rod 7 to be fabricated of a material which provides mechanical resistance to a fluid in contact therewith. Therefore, when using glaze (or engobe), the valve head 12 is fabricated from materials such as Nitrile butadiene rubber (NBR) or Titanium Grade 5 whilst the connecting rod 29 is formed of e.g. amorphous thermoplastic Polyetherimide (PEI).

In the present embodiment, the valve head 12 is formed of a cylindrical tube shaped component having an inner diameter of 1.9 mm and an outer diameter of 4 mm, whereby the bottom valve surface 6 of the valve head 30 extends radially substantially equidistant from axis X.

However, the valve head 12 diameter is not limited to being in the millimeter range, or even of uniform dimensions but its dimensions will at least be equal to the diameter of a nozzle inlet of a nozzle 10 formed in a nozzle portion 4 of a printhead, with which it is associated in the printhead.

The diameter of the valve-head 12 will preferably be larger than the diameter of the nozzle inlet such that it is operable to prevent/restrict the flow of glaze from the chamber into the nozzle 10. Furthermore, there is no requirement that the valve head 12 is limited to being cylindrical but the valve surface 6 thereof will be large enough to sufficiently cover the nozzle 10.

As described above, a nozzle portion refers to a portion of the printhead having at least one nozzle formed therein. In the present embodiment, the nozzle portion 4 is formed of any suitable material having mechanical and chemical properties resistant to the fluids used in the particular printing applications required by a user for example, PEEK (KETRON), PEI, Stainless Steel (LS316) or Silicon.

The nozzle portion 4 may be formed integral to the fluid-chamber during fabrication of the chamber, or may be a separate element which is assembled into the chamber during manufacture of the printhead, and secured in place using a suitable adhesive e.g. Loctite 438.

The nozzle 10 is formed by a suitable manufacturing technique e.g. by micro electrical discharge machining (EDM)/laser machining/chemical etching etc.

When printing with glaze or engobe the nozzle 10 preferably has a diameter between 100 µm-600 µm, and substantially between 375 µm-425 µm, and preferably the diameter is substantially equal to 400 µm.

However, in alternative embodiments, the diameter may be in the range of 80 µm-800 µm dependent on the specific application and/or the glaze or engobe used, whilst for embodiments using ink solutions e.g. MEK based or Acetone ink, the diameter may be in a much smaller range e.g. in the order of 10-60 µm.

The actuator 2 preferably comprises a piezoelectric element e.g. formed, for example of: lead zirconate titanate (PZT), barium titanate, potassium sodium niobate (KNN) and/or bismuth sodium titanate (BNT) or any suitable material, which, when subjected to an electric field e.g. a voltage differential, is deformed, thus displacing the obturator assembly 3 between the first position and the second position.

In a preferred embodiment, the piezoelectric element 2 is a substantially flat rectangular plate comprising one or more piezoelectric layers, configured to function as a bimorph, whereby the driving and contraction of the ceramic element creates a bending moment that converts a transversal change in length into a large bending displacement perpendicular to the contraction. Such functionality is obtained using known piezoelectric elements, for example, a PICMA® Bender Piezoelectric actuator (e.g. PL112-PL140), which allows for full differential control of the displacement. It will be appreciated that the shape of the piezoelectric element is not restricted to being a rectangular plate, but may be square, disc or any suitable polygonal shape.

In the present embodiment, the piezoelectric element 2 is located on retaining means (not shown), e.g. stainless steel pins, positioned towards each of its ends, such that the element is maintained in position thereon, such that it is operable to deflect (bend) substantially in the direction of displacement X.

As the obturator assembly 3 is connected or mechanically coupled to the actuator 2, when the actuator 2 deflects, the obturator assembly 3 will deflect in the same direction of displacement as the actuator 2. Therefore, the obturator assembly 3 is operable to move substantially in the direction of displacement X, between a first position, whereby the valve surface 6 is arranged at a distance from a nozzle surface 5 as shown in FIG. 2, and a second position, in which the valve surface 6 is in contact with the nozzle surface 5 as shown in FIGS. 3 & 4. As shown in FIGS. 2 and 3, the nozzle surface 5 is located on a reference surface A.

In the second position of the obturator assembly 3 as shown in FIG. 3, the valve surface 6 is maintained in contact with the nozzle surface 5, thereby closing the nozzle 10, to prevent glaze flowing into the nozzle 10. For this purpose the valve surface 6 should be co-planar with the surface 5, and capable of covering the nozzle 10 in the closed position, such that, in the closed position, the two surfaces 5 and 6, are coplanar and closure of the nozzle 10 is provided, such that glaze cannot flow into the nozzle 10.

In FIG. 2, the valve surface 6 is deliberately shown in an exaggerated non-parallel position with respect to the nozzle surface 5. It will be appreciated that if the valve surface 6 was maintained in the position relative to the nozzle surface 5 as demonstrated shown in FIG. 2 and obturator assembly 3 was deflected towards the nozzle surface 5, the valve surface 6 would not fully close the nozzle inlet of the nozzle 10, and a path would be formed between surfaces 5 & 6 whereby fluid could flow into the nozzle 10.

However, in the present embodiment, the obturator assembly 3 comprises an adjustable coupling 11 with a structure designed to allow the valve surface 6 to modify/align its orientation with respect to the nozzle surface 5.

Specifically, the adjustable coupling 11 comprises a shaped structure 8 arranged at a distal end of the elongated connecting rod 7. In the present embodiment the structure 8 comprises a spherical shape having a diameter configured to frictionally locate within the valve head 12, whilst enabling the valve head 12 to rotate about an axis of the structure 8.

Furthermore, the adjustable coupling 11 is adapted to allow rotation of the valve surface 6 about an adjusting centre O when it is depressed onto the nozzle surface 5 on actuation of the piezoelectric element 2, such that the valve head 12 of the adjustable coupling 11 is operable to rotate about the adjusting centre O such that the valve surface 6 modifies its orientation to align substantially parallel to the nozzle surface 5.

In a preferred embodiment, biasing means 9 are provided which allow the valve head 12 of the adjustable coupling 11 to be displaced along the direction of displacement X towards the structure 8, and away from the nozzle surface 5 when the valve surface 6 is depressed into contact with the nozzle surface 5, so as not to exert excessive force on the obturator assembly 3, the nozzle surface 5 or actuator 2.

In the preferred embodiment of the obturator device 1, the biasing means is an elastomeric spring 9 arranged between the structure 8 and the valve head 12, such that the valve head 12 is biased away from the structure 8.

For example, a first end of the elastomeric spring 9, e.g. NBR, is attached to a distal end of the structure 8, whilst a second end of the spring means is attached to or located towards an inside bottom surface of the valve head 12.

Alternatively, the spring means 9 is formed as an elastomeric membrane e.g. an NBR 'O' Ring which also acts as a seal between a space in which the obturator assembly 3 is movable (i.e. the fluid-chamber 17) and the valve head 12, as schematically shown in the printhead 51 of FIG. 4. The space inside which the obturator assembly is movable contains a fluid to be deposited (e.g. enamel/engobe/ink) on a substrate e.g. by inkjet printing, whereby deflection of the obturator assembly between the first and second positions at e.g. 1 kHz results in fluid filling the nozzle 10 via a nozzle inlet 61 and ejection of a droplet from the fluid chamber, from an outlet of the nozzle 10, onto a substrate at the exterior of the printhead 51.

Fixing means are provided for securing the coupling 11 in the position when the valve surface 6 is aligned with the nozzle surface 5.

The fixing means may comprise an adhesive such as material inserted inside the adjustable coupling 11, such as Loctite 438.

In the preferred embodiment of the obturator device, the adhesive material is applied to/provided inside the valve head 12 of the adjustable coupling 11 or the structure 8 to secure/bond the structure 8 relative to the valve head 12, such that the valve surface 6 is retained in position parallel relative to the surface 5 during repeated deflection of the obturator assembly 3 between the first and second positions, such that the valve surface 6 and nozzle surface 5 co-locate such that fluid is prevented/restricted from flowing into the nozzle when the obturator assembly 3 is in the second position.

As previously mentioned above, the obturator device according to the present invention is particularly useful, but not limited to use, in a printhead for ink-jet printing applications. For example, the obturator device may be useful in applications for cardboard & ceramic substrates, 3D-printing, printing foodstuff such as chocolate, cream etc.

The obturator device according to the present invention therefore ensures that a substantially parallel arrangement of the valve surface 6 and the reference surface A is obtained, substantially independently of the manufacturing and/or assembly tolerances of the various components which may be normally obtained with the currently available manufacturing processes.

As a result of the present invention it is possible to achieve parallel coplanarity between a valve surface of an obturator assembly and a surface of a nozzle portion, thus ensuring optimum coupling of these surfaces.

A printhead may be provided with one, or a plurality of nozzles, whereby an obturator assembly is provided for each individual nozzle.

Whilst bimorph piezoelectric elements are described in the embodiments above, whereby the elements are retained/fixed towards both ends to allow the elements to deflect in a concave or convex direction relative to the reference plane A, the elements may be fixed at one end so as function as a cantilever having an obturator assembly attached thereto to control droplet ejection. Single layer bender style actuators mounted to inert metal substrates could also be used, e.g. "thunder style actuators." Alternatively, the piezoelectric element may be arranged as both chevron and monolithic piezoelectric elements as will be appreciated by a person skilled in the art.

It will also be seen that using actuators other than piezoelectric actuators could also be used to provide the same driving functionality to effect droplet ejection, for example electrostatic actuators, magnetic actuators, electrostrictive actuators, thermal uni/bi morph elements, solenoids, shape memory alloys etc. could readily be used to provide the functionality described above whilst obtaining the desirable functionality as will be apparent to the skilled person upon reading the above specification.

Furthermore, the pressures values described above relate to gauge pressure. However it will be appreciated that absolute pressure may also be used as a measurement of the pressure in the system.

The invention claimed is:

1. An obturator device (1) for a printhead comprising:
an obturator assembly (3) having a valve surface (6) movable along at least one direction of displacement (X) between a first position, in which the valve surface (6) is at a distance from a reference surface (A), and a second position, in which the valve surface (6) is in contact with the reference surface (A); and
an actuator (2), secured to the obturator assembly (3) and operable to displace the obturator assembly (3) between the first position and second position, wherein the obturator assembly (3) comprises an adjustable coupling (11) configured to allow the valve surface (6) to align relative to the reference surface (A),
wherein a fixing means is operable to retain the valve surface (6) in a position wherein the valve surface (6) is substantially parallel with the reference surface (A) during repeated deflection of the obturator assembly (3) between the first and second positions.

2. The obturator device according to claim 1, wherein the adjustable coupling (11) is configured to allow rotation of the valve surface (6) about a centre (O).

3. The obturator device according to claim 1, wherein the adjustable coupling (11) has a structure designed to allow displacement of the valve surface (6) along the at least one direction of displacement (X).

4. The obturator device according to claim 1, wherein the obturator assembly (3) further comprises a connecting element (7), and a valve head (12), with which the valve surface (6) is associated and which is adapted to house at least part of the connecting element (7).

5. The obturator device according to claim 4, further comprising biasing means (9) arranged between the connecting element (7) and the valve head (12) configured to bias the valve surface (6) away from the connecting element (7).

6. The obturator device according to claim 4 wherein the connecting element (7) further comprises a shaped structure (8) at a distal end thereof.

7. The obturator device according to claim 6, wherein the shaped structure is substantially spherical.

8. The obturator device according to claim 1, wherein the fixing means comprise an adhesive.

9. The obturator device according to claim 8, wherein the adhesive material is arranged between a connecting element (7) and a valve head (12).

10. The obturator device according to claim 1, wherein the actuator (2) comprises a piezoelectric element.

11. A printhead (51) comprising: a nozzle portion (4) having a surface (5) which is coplanar with the reference surface (A); and an obturator device (1) according to claim 1.

12. A printer, for inkjet printing, having an obturator device as claimed in claim 1.

13. A method for adjusting the orientation of a valve surface (6) associated with an obturator assembly (3) by means of an adjustable coupling (11) adapted to allow the valve surface (6) to rotate about an adjusting centre (O), comprising the following steps: displacing the obturator assembly (3) along a direction of displacement (X) so as to bring the valve surface (6) into contact with a reference surface (A) wherein the valve surface (6) is operable to modify an orientation of the valve surface (6) to be substantially parallel to the reference surface (A) when in contact therewith; and fixing the valve surface (6) in position wherein the valve surface (6) is substantially parallel with the reference surface (A) during repeated deflection of the obturator assembly (3) between the first and second positions.

* * * * *